United States Patent [19]

VanRiper et al.

[11] Patent Number: 4,891,625
[45] Date of Patent: Jan. 2, 1990

[54] COMBINATION CENTER HIGH MOUNTED STOP LAMP AND CARGO LAMP

[75] Inventors: Bradley C. VanRiper, Kennedy; Marlin Ong, Lakewood, both of N.Y.

[73] Assignee: Truck-Lite Co., Inc., Falsoner, N.Y.

[21] Appl. No.: 237,579

[22] Filed: Aug. 29, 1988

[51] Int. Cl.⁴ ............................................... B60Q 1/00
[52] U.S. Cl. ..................... 340/479; 340/468; 340/464; 362/61
[58] Field of Search ...................... 340/66, 67, 71, 72, 340/89, 92, 93, 94, 464, 468, 479; 362/61; 307/10.8

[56] References Cited

U.S. PATENT DOCUMENTS

| | | | |
|---|---|---|---|
| 3,375,496 | 3/1968 | Antunovic | 340/66 |
| 3,395,388 | 7/1968 | Hendrickson | 340/66 |
| 3,665,392 | 5/1972 | Annas | 340/67 |
| 4,449,167 | 5/1984 | Cohen | 362/61 |
| 4,464,649 | 8/1984 | Her | 340/66 |
| 4,471,411 | 9/1984 | Graham et al. | 340/468 |
| 4,692,845 | 9/1987 | Widhalm et al. | 362/61 |
| 4,707,767 | 11/1987 | Bergin et al. | 362/61 |
| 4,734,697 | 3/1988 | Robinson et al. | 340/66 |
| 4,758,931 | 7/1988 | Gabaldon | 362/61 |
| 4,791,401 | 12/1988 | Heidman, Jr. | 340/66 |

Primary Examiner—Joseph A. Orsino
Assistant Examiner—Brent A. Swarthout
Attorney, Agent, or Firm—Mason, Fenwick & Lawrence

[57] ABSTRACT

A combined center high mounted stop lamp and cargo lamp assembly for pick-up trucks, vans and the like, including a unitary integral molded laterally elongated casing member to be mounted on a truck cab, van, or the like, shaped to provide an exterior hood-like collar formation defining an encircling surround about a horizontal transverse elongated plural lamp zone for three side-by-side lamps. Three truncated substantially parabolic reflector cellular formations extend from the collar formation toward the front of the vehicle in use position defining lamb-bulb-housing reflector cavities directing light rearwardly of the vehicle and being provided with reflective metal coatings on the inner surfaces thereof. A red lens is supported by said collar formation in rearwardly covering relation to the centermost cellular formation and white lenses are provided for the other two cellular formations.

14 Claims, 4 Drawing Sheets

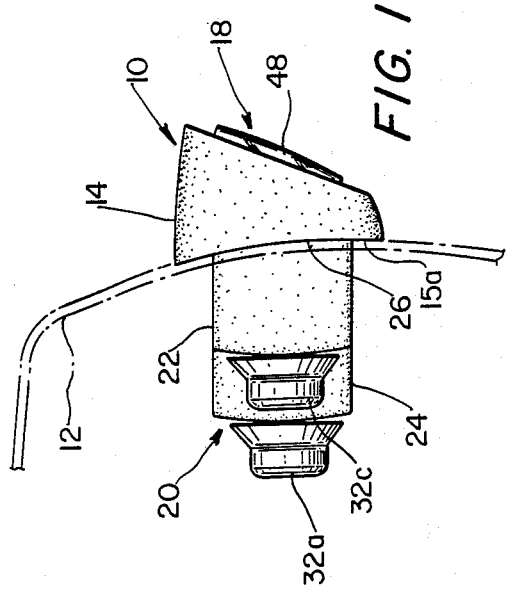
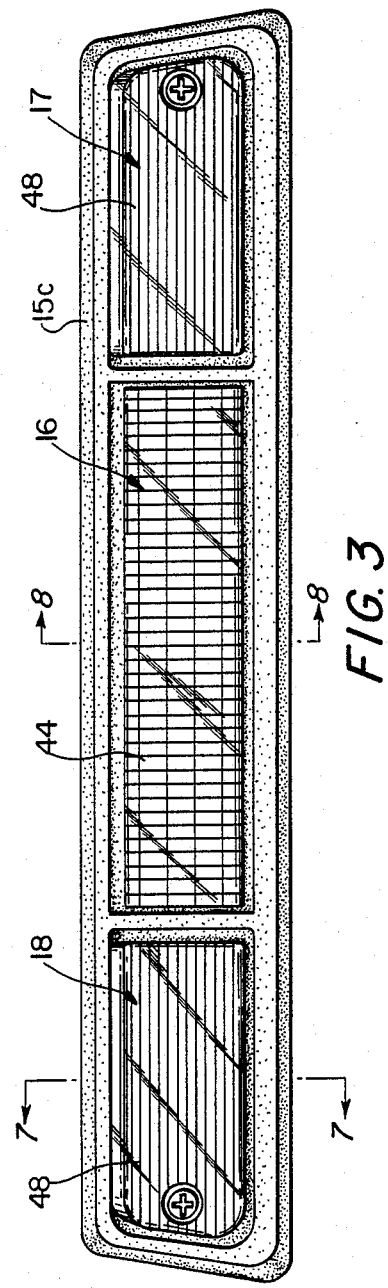

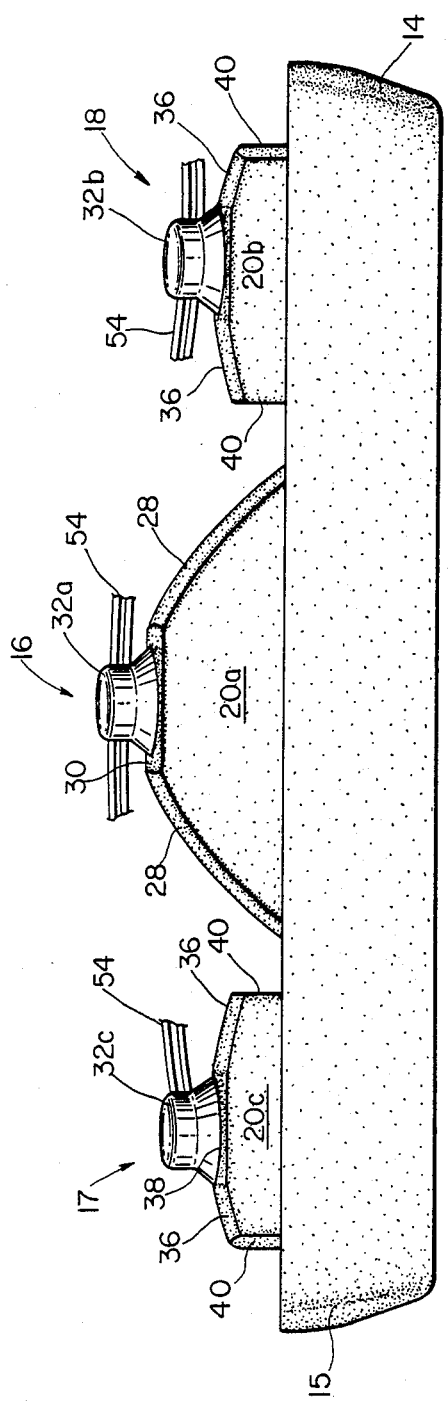
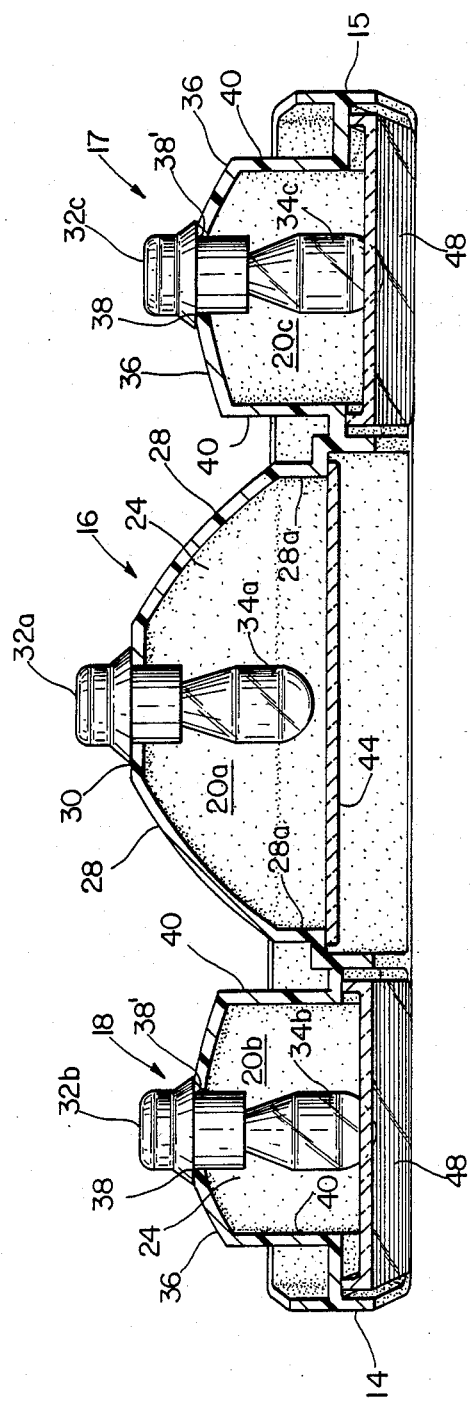

COMBINATION CENTER HIGH MOUNTED STOP LAMP AND CARGO LAMP

BACKGROUND AND OBJECTS OF THE INVENTION

The present invention relates in general to multi-lamp units for vehicles, and more particularly to multiple lamp assemblies providing a center high mounted stop lamp and cargo or similar function lamps for use on vans, pick-up trucks, utility vehicles and the like.

Heretofore, double lamps have been provided for automotive vehicles, such as double braking lamps having red lenses for automotive stop and braking signaling, and a plurality of lamps with different lenses have been provided for the rear body lamp banks or arrays at each side of the vehicle providing a red lens braking or stop lamp and a clear lens providing white light for a backup lamp, arranged in sets at each side of the vehicle.

An object of the present invention is the provision of a novel type of lamp assembly especially for use on vans, pick-up trucks and utility vehicles, which provides the combined features of a center high mounted stop lamp and also provides a pair of cargo lamps, which are optically separate, with the high mounted stop lamp meeting the Federal Department of Transportation requirements for center stop lamps and the cargo lamps providing illumination for a pick-up truck box or to serve as a utility light on vans and utility vehicles. In this manner, the single unit can provide a center high mounted stop lamp visible to a following vehicle and also provide the added feature of cargo area illumination. By providing a single housing or casing having a main collar or hood portion forming a framing or encircling surround about an array of cellular lamp and reflector units, shaped to adapt it readily to be mounted on the cab or upper rear high body portion of a pick-up truck or van with the reflector and lamp units arranged side-by-side and forming truncated parabolic surfaces covered by lenses of appropriate color and angular disposition, a single unitary structure is provided which combines high mounted center stop lamp and cargo lamp functions in a novel and convenient manner.

Other objects, advantages and capabilities of the present invention will become apparent from the following detailed description, taken in conjunction with accompanying drawings illustrating a preferred embodiment of the invention.

BRIEF DESCRIPTION OF THE FIGURES

FIG. 1 is a side elevational side of a combination center high mounted stop lamp and cargo lamp embodying the present invention, shown mounted on an upper rear portion of a pick-up truck cab or van indicated in broken lines;

FIG. 3 is a rear elevational view thereof;

FIG. 4 is a top plan view thereof;

FIG. 6 is a horizontal transverse section view thereof with the lamp bulbs removed;

DETAILED DESCRIPTION OF A PREFERRED EMBODIMENT

Figure 2:
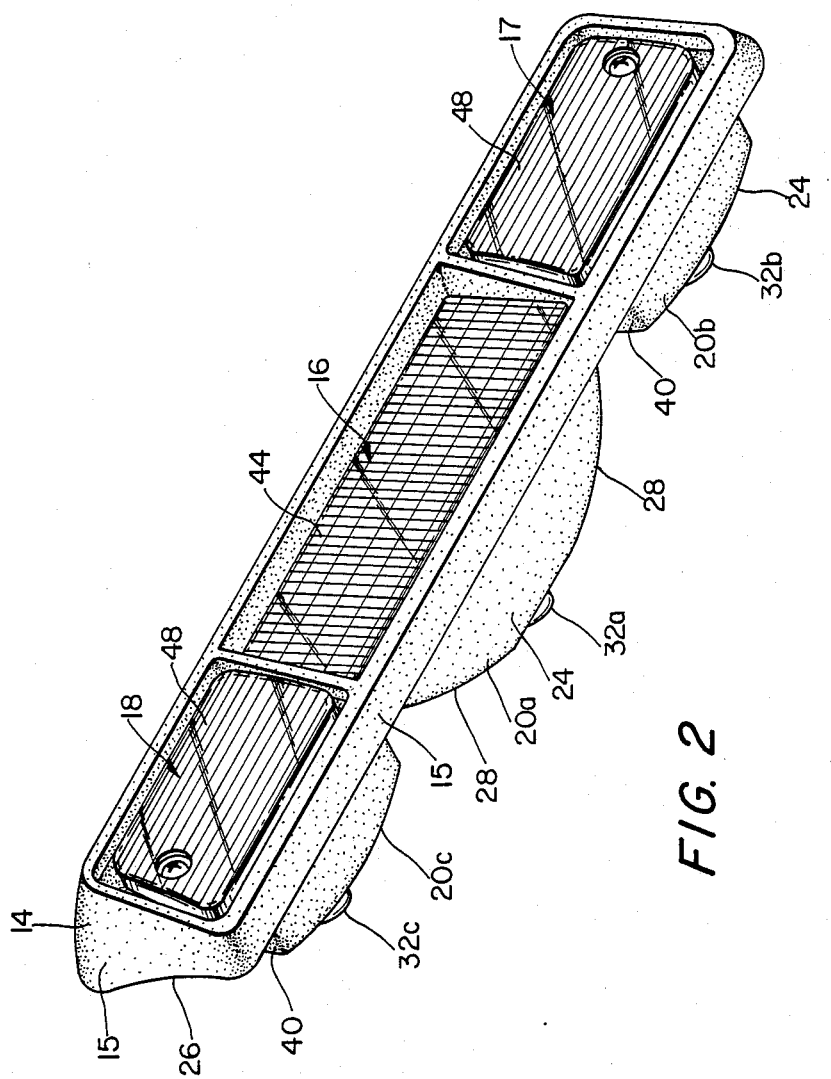
FIG. 2 is a perspective, viewed from the front and below, of the combination, stop lamp and cargo lamp.
Figure 5:
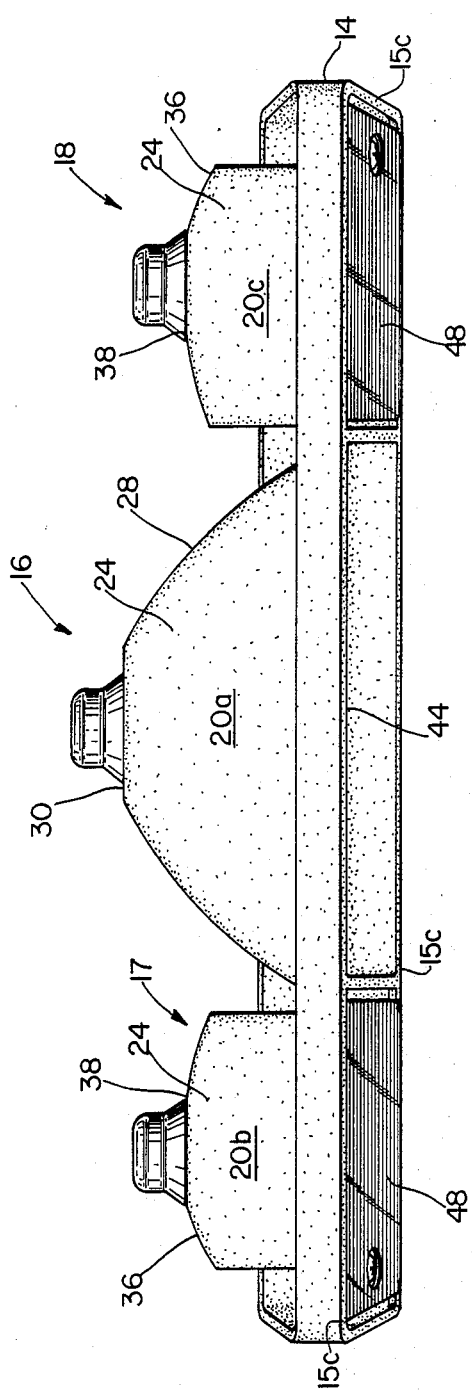
FIG. 5 is a bottom view thereof.
Figure 8:
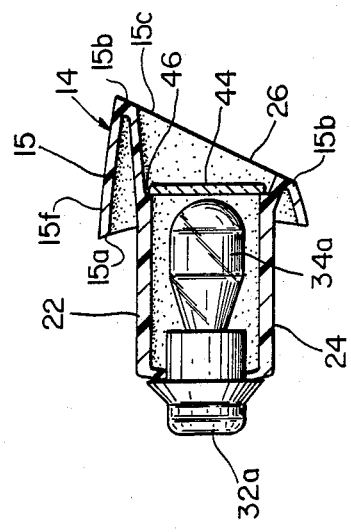
FIG. 8 is a vertical section view through the high mounted stop lamp, taken along the lines 8—8 of FIG. 6.
Figure 7:
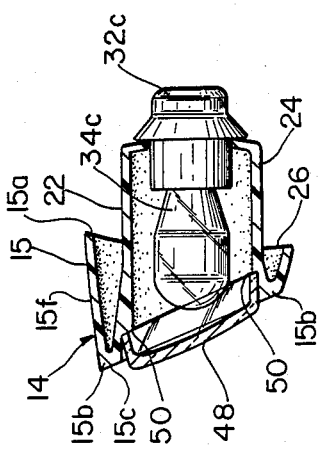
FIG. 7 is a vertical section view through one of the cargo lamps, taken along the lines 7—7 of FIG. 4.

Referring to the drawings, wherein like reference characters designate corresponding parts throughout the Figures, the combination center high mounted stop lamp and cargo lamp assembly of the present invention is indicated generally by the reference character 10, and is shown in FIG. 1 as mounted on the upper rear portion of the cab, indicated in broken lines by the reference character 12, of a pick-up truck or similar utility vehicle, although it may be understood that the portion of the vehicle designated by the broken line 12 may also represent the upper rear portion of a van or the like. As shown in FIG. 1, the combination stop lamp and cargo lamp assembly includes a casing or main body 14, formed for example from a high impact molded plastic, providing a unitary exterior collar or hood-like formation forming an encircling frame for a center high mounted stop lamp indicated at 16 and a pair of flanking cargo lamps 17, 18 arranged as a laterally elongated bar or series of lamps.

Projecting forwardly or toward the front of the vehicle from the exterior collar or framing surround portion 15 are three truncated parabolic reflector cellular formations 20a, 20b, and 20c which have flat substantially planiform top and bottom surfaces 22, 24 and are arranged in a laterally aligned series of protruding reflector-forming bulges which may be readily inserted through a rectangular opening cut in the rearwardly facing wall portion of the trunk cab or van rear body portion 12. The cut forms a laterally elongated rectangular opening having upper and lower parallel edges spaced slightly further apart than the vertical spacing between the top and bottom flat surfaces 22, 24 of the cellular reflector formations 20, and which have vertical side edges spaced apart a distance slightly greater than the total distance spanned by the three cellular reflector formations 20. The collar or hood-like framing surround 15 of the casing 14 is shaped to define a recurved flange portion 15f having a curved stop surface 15a forming an abutment edge at the forwardmost end of appropriate configuration to conform to the shape of the confronting surface portions of the cab or van bounding the opening which receives the cellular parabolic reflector formations 20 and to be tightly sealed against such confronting surfaces by appropriate sealing compound to ensure a water tight joint. The recurved flange portion 15f terminates rearwardly in a return bend 15b defining a rounded border 15c framing the lenses of the lamp units 16, 17 and 18.

As will be evident from inspection of the drawings, the cellular reflector formation 20a for the stop lamp is provided with substantially parabolic convex surfaces 28 curving forwardly of the vehicle from a substantially flat wall portion 30 at the base end thereof suitably aperatured to receive the base 32a of a stop lamp 34a and merging into short truncation wall sections 28a adjacent the collar or hood-like formation 15, all of which are vacu-metalized on the inside surface portions 28 and 30 to provide high reflectivity and define a parabolic reflector surface for the stop lamp. Similarly, the cargo lamps cellular units 17, 18, have substantially parabolically curved reflector wall sections 36 extending from a flattened base region 38 immediately adjacent the hole 38' therein for receiving the base 32b or 32c for the cargo lamps 34b, 34c. The curved walls 36 of the cargo lamps 20b, 20c extend to and join substantially vertical flat truncation wall sections 40 which extend to and integrally join the collar or hood-like surround portion 15 of the casing 14, as a unitary single molding. The inside surfaces of these reflector cellular units 17, 18 of the cargo lamps are also vacu-metalized to provide high reflectively.

The truncated parabolic reflector cellular formation 20a is covered by a red lens 44 at the transverse center of the combined stop lamp and cargo lamps structure, designed to meet the Federal Department of Transportation requirements for high mounted stop lamps, and in the illustrated embodiment is located by abutment shoulder formations 46 to be disposed in a substantially vertical plane when the lamp assembly is properly installed in its position of use on the truck cab or van. The two flanking truncated parabolic reflector cellular units 20b and 20c for cargo lamps are covered by clear lenses 48 with optics to direct light for cargo or utility functions, which in the illustrated embodiment are positioned by the abutment shoulder surfaces 50 in a plane which inclines upwardly and rearwardly relative to the vertical plane through the stop lamp lenses 44, to effectively direct light down into the cargo area of the pickup truck or the area rearwardly of the rear doors of the van. The lenses 44 and 48 are tightly secured in sealed relation against the abutment shoulder surfaces 46 and 50 by suitable known sealing adhesive compounds, and the lamp bases 32a, 32b and 32c are suitably connected together by conventional wire harness 54 connected to a suitable plug to supply power appropriately to the lamp bulbs 34a, 34b and 34c.

We claim:

1. A combined center high mounted stop lamp and cargo lamp assembly for vehicles to be mounted on a rearwardly facing wall surface of the vehicle body near the top thereof at the transverse center of the vehicle, comprising a unitary integral molded laterally elongated casing member to be mounted on said rearwardly facing wall surface, the casing member being formed with an exterior hood-like collar formation defining an encircling surround about a horizontal transverse elongated plural lamp zone for three side-by-side lamps and the casing member including three substantially parabolic reflector cellular formations extending from the collar formation toward the front of the vehicle as three protruding reflector-forming bulges, the walls of said reflector cellular formations being shaped to define lamp-bulb-housing reflector cavities directing light rearwardly of the vehicle and being provided with reflective metal coatings on the inner surfaces thereof, a lamp bulb removably mounted in the forwardmost portion of the bulge-forming wall of each cellular formation along a principal optical axis of each, and a lens supported by said collar formation in rearwardly covering relation to each respective reflector cavity of the cellular formations, the lens for the centermost cellular formation being a red lens and the lenses for the other two cellular formations in flanking relation therewith being clear lenses, the walls of the cellular formations being of substantially parabolic contour in horizontal cross-section extending along a convex path protruding toward the front of the vehicle from the collar formation and joining a transverse substantially vertical interior partition thereof by short wall sections perpendicular thereto.

2. A combined stop lamp and cargo lamp assembly as defined in claim 1, wherein said cellular formations include substantially horizontal parallel top and bottom walls perpendicular to said interior partition.

3. A combined stop lamp and cargo lamp assembly as defined in claim 1, wherein said red lens of the stop lamp is supported in a substantially vertical plane when the assembly is in use position and said clear lenses of the cargo lamps are disposed in a plane inclining upwardly and rearwardly of the vehicle relative to the plane of the red lens.

4. A combined stop lamp and cargo lamp assembly as defined in claim 2, wherein said red lens of the stop lamp is supported in a substantially vertical plane when the assembly is in use position and said clear lenses of the cargo lamps are disposed in a plane including upwardly and rearwardly of the vehicle relative to the plane of the red lens.

5. A combined stop lamp and cargo lamp assembly as defined in claim 1, wherein the inwardly facing surfaces of the reflector cavities defined by said cellular formations are covered with a vacu-metalized deposit providing said reflective metal coatings thereon.

6. A combined stop lamp and cargo lamp assembly as defined in claim 2, wherein the inwardly facing surfaces of the reflector cavities defined by said cellular formations are covered with a vacu-metalized deposit providing said reflective metal coatings thereon.

7. A combined stop lamp and cargo lamp assembly as defined in claim 3, wherein the inwardly facing surfaces of the reflector cavities defined by said cellular formations are covered with a vacu-metalized deposit providing said reflective metal coatings thereon.

8. A combined stop lamp and cargo lamp assembly as defined in claim 4, wherein the inwardly facing surfaces of the reflector cavities defined by said cellular formations are covered with a vacu-metalized deposit providing said reflective metal coatings thereon.

9. A combined stop lamp and cargo lamp assembly as defined in claim 1, wherein said exterior hood-like collar formation is provided by a recurved flange extending rearwardly relative to the vehicle from adjacent said lenses to a return bend defining a rounded border framing the three side-by-side lenses, and the recurved flange then extending forwardly of the vehicle to an abutment edge shaped to conform to and be sealed against a confronting surface of said upper vehicle wall portion.

10. A combined stop lamp and cargo lamp assembly as defined in claim 2, wherein said exterior hood-like collar formation is provided by a recurved flange extending rearwardly relative to the vehicle from adjacent said lenses to a return bend defining a rounded boarder framing the three side-by-side lenses, and the recurved flange then extending forwardly of the vehicle to an abutment edge shaped to conform to and be sealed against a confronting surface of said upper vehicle wall portion.

11. A combined stop lamp and cargo lamp assembly as defined in claim 3 wherein said exterior hood-like collar formation is provided by a recurved flange extending rearwardly relative to the vehicle from adjacent said lenses to a return bend defining a rounded border framing the three side-by-side lenses, and the recurved flange then extending forwardly of the vehicle to an abutment edge shaped to conform to and be sealed against a confronting surface of said upper vehicle wall portion.

12. A combined stop lamp and cargo lamp assembly as defined in claim 4, wherein said exterior hood-like collar formation is provided by a recurved flange extending rearwardly relative to the vehicle from adjacent said lenses to a return bend defining a rounded border framing the three side-by-side lenses, and the recurved flange then extending forwardly of the vehicle to an abutment edge shaped to conform to and be sealed against a confronting surface of said upper vehicle wall portion.

13. A combined stop lamp and cargo lamp assembly as defined in claim 8, wherein said exterior hood-like collar formation is provided by a recurved flange extending rearwardly relative to the vehicle from adjacent said lenses to a return bend defining a rounded border framing the three side-by-side lenses, and the recurved flange then extending forwardly of the vehicle to an abutment edge shaped to conform to and be sealed against a confronting surface of said upper vehicle wall portion.

14. A combined center high mounted stop lamp and cargo lamp assembly for vehicles to be mounted on a rearwardly facing wall surface of the vehicle body near the top thereof at the transverse center of the vehicle, comprising a unitary integral molded laterally elongated casing member to be mounted on said rearwardly facing wall surface, the casing member being formed with an exterior hood-like collar formation defining an encircling surround about a horizontal transverse elongated plural lamp zone for three side-by-side lamps and the casing member including three substantially parabolic reflector cellular formations extending from the collar formation toward the front of the vehicle as three protruding reflector-forming bulges, the walls of said reflector cellular formations being shaped to define lamp-bulb-housing reflector cavities directing light rearwardly of the vehicle and being provided with reflective metal coatings on the inner surfaces thereof, a lamp bulb removably mounted in the forwardmost portion of the bulge-forming wall of each cellular formation along a principal optical axis of each, and a lens supported by said collar formation in rearwardly covering relation to each respective reflector cavity of the cellular formations, the lens for the centermost cellular formation being a red lens and the lenses for the other two cellular formations in flanking relation therewith being clear lenses, said exterior hook-like collar formation being provided by a recurved flange extending rearwardly relative to the vehicle from adjacent said lenses to a return bend defining a rounded border framing the three side-by-side lenses, and the recurved flange then extending forwardly of the vehicle to an abutment edge shaped to conform to and be sealed against a confronting surface of said upper vehicle wall portion.

* * * * *